United States Patent
Zhu et al.

(10) Patent No.: US 9,198,058 B2
(45) Date of Patent: Nov. 24, 2015

(54) METHOD FOR SWITCHING WORKING MODE ON RELAY NETWORK, BASE STATION, RELAY NODE, AND COMMUNICATIONS SYSTEM

(71) Applicant: Huawei Technologies Co., LTD, Shenzhen (CN)

(72) Inventors: Chongming Zhu, Shanghai (CN); Bin Wang, Shanghai (CN); Liang Xu, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 125 days.

(21) Appl. No.: 14/134,608

(22) Filed: Dec. 19, 2013

(65) Prior Publication Data
US 2014/0105078 A1    Apr. 17, 2014

Related U.S. Application Data

(63) Continuation of application No. PCT/CN2011/076118, filed on Jun. 22, 2011.

(51) Int. Cl.
*H04B 7/00* (2006.01)
*H04W 24/02* (2009.01)
*H04B 7/155* (2006.01)
(Continued)

(52) U.S. Cl.
CPC ............... *H04W 24/02* (2013.01); *H04B 7/15* (2013.01); *H04B 7/15557* (2013.01); *H04L 5/14* (2013.01); *H04W 84/047* (2013.01)

(58) Field of Classification Search
CPC ........ H04W 16/32; H04W 84/02; H04W 84/04
USPC .......................... 370/310, 315, 328, 329, 343
See application file for complete search history.

(56) References Cited

U.S. PATENT DOCUMENTS 6,665,275 B1    12/2003  Davy et al.
7,415,282 B2 *   8/2008  Tillet et al. ..................... 455/509
(Continued)

FOREIGN PATENT DOCUMENTS

CN    1905728 A      1/2007
CN    101388707 A    3/2009
(Continued)

OTHER PUBLICATIONS

Extended European Search Report received in Application No. 11857849.1-1852 mailed May 9, 2014, 8 pages.
(Continued)

*Primary Examiner* — Dmitry H Levitan
(74) *Attorney, Agent, or Firm* — Slater & Matsil, L.L.P.

(57) ABSTRACT

The present invention provides a method for switching a working mode on a relay network, a base station, a relay node, and a communications system. A donor eNB (DeNB) sends an RN reconfiguration message to a relay node RN in frequency division duplex FDD mode, so that the RN switches from the FDD mode to a half-duplex frequency division duplex H-FDD mode. The DeNB receives an acknowledgment message sent by the RN in FDD mode. When the DeNB verifies, according to the RN reconfiguration message and the acknowledgement message, that the RN has already started to switch from the FDD mode to the H-FDD mode, the DeNB switches from the FDD mode to the H-FDD mode.

20 Claims, 3 Drawing Sheets

(51) Int. Cl.
*H04B 7/15* (2006.01)
*H04L 5/14* (2006.01)
*H04W 84/04* (2009.01)

(56) References Cited

U.S. PATENT DOCUMENTS

| | | | |
|---|---|---|---|
| 8,542,617 B2* | 9/2013 | Choi et al. | 370/296 |
| 8,837,390 B2* | 9/2014 | Yu et al. | 370/329 |
| 8,934,350 B2* | 1/2015 | Chen et al. | 370/241 |
| 8,958,289 B2* | 2/2015 | Lee et al. | 370/228 |
| 9,014,079 B2* | 4/2015 | Wiberg et al. | 370/315 |
| 9,030,977 B2* | 5/2015 | Chen et al. | 370/310 |
| 2006/0025165 A1 | 2/2006 | Tillet et al. | |
| 2009/0268641 A1 | 10/2009 | Yim et al. | |
| 2009/0296609 A1 | 12/2009 | Choi et al. | |
| 2010/0142418 A1 | 6/2010 | Nishioka et al. | |
| 2011/0038283 A1 | 2/2011 | Yu et al. | |
| 2011/0103224 A1 | 5/2011 | Nishioka et al. | |
| 2011/0267991 A1* | 11/2011 | Damnjanovic et al. | 370/279 |
| 2011/0268064 A1* | 11/2011 | Chen et al. | 370/329 |
| 2012/0120924 A1* | 5/2012 | Montojo et al. | 370/336 |
| 2012/0140700 A1 | 6/2012 | Huang | |
| 2013/0016653 A1* | 1/2013 | Kim et al. | 370/315 |
| 2013/0343340 A1* | 12/2013 | Seo et al. | 370/330 |
| 2014/0064158 A1* | 3/2014 | Timus | 370/279 |

FOREIGN PATENT DOCUMENTS

| | | |
|---|---|---|
| CN | 101765250 A | 6/2010 |
| CN | 101785279 A | 7/2010 |
| CN | 101785282 A | 7/2010 |
| CN | 101998554 A | 3/2011 |
| CN | 102075235 A | 5/2011 |
| JP | 2002094600 A | 3/2002 |

OTHER PUBLICATIONS

IEEE Standard for Local and metropolitan area networks, Part 16: Air Interface for Broadband Wireless Access System, Amendment 1: Multihop Relay Specification, IEEE Computer Society and the IEEE Microwave Theory and Techniques Society, 802.16j, Jun. 12, 2009, 314 pages.

International Search Report and Written Opinion received in Application No. PCT/CN2011/076118 mailed Mar. 29, 2012, 10 pages.

Ericsson, "Introduction of relays in RRC," 3GPP TSG-RAN WG2 Meeting #72, R2-106886, Jacksonville, US, Nov. 15-19, 2010, 19 pages.

Japanese Office Action received in Application No. 201180000943.9 mailed Apr. 21, 2014, 9 pages.

Japanese Search Report received in Application No. 2011800009439 mailed Apr. 9, 2014, 3 pages.

* cited by examiner

METHOD FOR SWITCHING WORKING MODE ON RELAY NETWORK, BASE STATION, RELAY NODE, AND COMMUNICATIONS SYSTEM

This application is a continuation of International Application No. PCT/CN2011/076118, filed on Jun. 22, 2011, which is hereby incorporated by reference in its entirety.

TECHNICAL FIELD

Embodiments of the present invention relate to the field of mobile communications technologies, and in particular, to a method for switching a working mode on a relay network, a base station, a relay node, and a communications system.

BACKGROUND

In a Long Term Evolution-Advance (LTE-Advance) system, to improve coverage of a cell edge, a radio access network of an original Long Term Evolution (LTE) is expanded, and a relay technology is introduced. In the relay technology, a relay node (RN) is used to provide radio services for a user equipment (UE), which increases quality of communication between the UE and a DeNB. In addition, each RN has only one donor eNB (DeNB).

Communication between the RN and the DeNB is implemented by using a backhaul link (backhaul link), and communication between the RN and the UE is implemented by using an access link (access link). The backhaul link and the access link can separately implement, by using a half-duplex frequency division duplex (H-FDD) mode, data transmission between the RN and the DeNB and between the RN and the UE. The H-FDD is another duplex mode relative to a current frequency division duplex (FDD). Like the FDD mode, the H-FDD mode uses different frequency bands in an uplink channel and a downlink channel, and uses a paired spectrum. In H-FDD mode, a frame structure mode of the FDD may still be used, and there is only a slight difference between the H-FDD mode and the FDD mode during implementation of a physical layer in a radio interface protocol stack. However, at a MAC layer and a physical layer of the radio interface protocol stack, radio resources need to be allocated properly according to a sending manner and a receiving manner of the H-FDD.

When both the DeNB and the RN use the H-FDD mode, in the downlink channel, the DeNB and the RN separately send information to the RN and the UE by using different subframes. Similarly, in the uplink channel, the DeNB and the RN also separately receive, by using different subframes, information sent by the RN and the UE. This manner of receiving and sending information by using different subframes can avoid mutual interference between the access link and the backhaul link. In a process of accessing the DeNB by the RN, the DeNB sends an RN reconfiguration message (RN_RECFG message) to the RN in FDD mode. The RN receives the RN_RECFG message in FDD mode, and configures, according to the RN_RECFG message, communication parameters in an RN-side radio interface protocol stack to prepare for communication with the DeNB.

In the prior art, when the DeNB is in H-FDD mode, the DeNB sends information to the RN by using a downlink control channel allocated to the RN, which may also be referred to an RN-side physical downlink control channel (R_PDCCH channel). Using one frame structure as an example, the R_PDCCH channel occupies several resource blocks in a frequency domain, and a position occupied by the R_PDCCH channel in a time domain is a position after a length of symbols occupied by a PDCCH channel is deducted.

For example, the RN receives, in a physical downlink control channel (PDCCH channel), a scheduling message sent by the DeNB, and receives an RN_RECFG message according to the scheduling message. After finishing configuring the communication parameters in the RN-side radio interface protocol stack, the RN enters an H-FDD state and receives and sends data in H-FDD mode. At this time, the RN can only receive downlink resource allocation information of the DeNB in the R_PDCCH channel, and cannot receive downlink resource allocation information of the DeNB in the PDCCH channel.

After finishing configuring the communication parameters in the RN-side radio interface protocol stack, the RN generates an RN reconfiguration completion message (RN Reconfiguration Completion, hereinafter abbreviated as RN_RECFG_CMP message). At this time, the RN has already entered the H-FDD state, and the RN reports the RN_RECFG_CMP message to the DeNB in H-FDD mode. In the prior art, the DeNB sends a scheduling message of the RN_RECFG_CMP message to the RN, where the scheduling message includes a subframe position that is allocated to the RN and used to send the RN_RECFG_CMP message to the DeNB. After receiving the scheduling message, the RN sends, at the subframe position, the RN_RECFG_CMP message to the DeNB.

However, the foregoing process may have the following risks.

In a first case, before the DeNB sends a scheduling message of the RN_RECFG_CMP message to the RN, the RN has already switched to the H-FDD state, but the DeNB is still in an FDD state. At this time, the DeNB may still send a scheduling message of the RN_RECFG_CMP message in the PDCCH channel. Because the RN has already switched to the H-FDD state at this time, the RN can only obtain the downlink resource allocation information sent by the DeNB in the R_PDCCH channel, and cannot receive the downlink resource allocation information sent by the DeNB in the PDCCH channel. As a result, the RN cannot receive the scheduling message sent by the DeNB, and further the RN cannot send the RN_RECFG_CMP message to the DeNB.

In a second case, when the RN receives, in FDD mode and in the PDCCH channel, the RN_RECFG message sent by the DeNB in FDD mode, the RN sends a radio link control acknowledgement message (Radio Link Control Acknowledge message, abbreviated as RLC ACK message) to the DeNB. At this time, if the DeNB has already switched to the H-FDD state but the RN is still in the FDD state, the DeNB can only receive messages sent by the RN in some subframes; if the RLC ACK message sent by the RN to the DeNB is located in other subframes, the RL ACK message cannot be received by the DeNB. Therefore, the DeNB cannot receive the RLC ACK message sent by the RN, and as a result, the RN cannot access a network or accesses the network abnormally.

SUMMARY OF THE INVENTION

Embodiments of the present invention provide a method for switching a working mode on a relay network, a base station, a relay node, and a communications system.

One aspect of the present invention provides a method for switching a working mode on a relay network. A donor eNB (DeNB) sends an RN reconfiguration message to a relay node RN in frequency division duplex FDD mode, so that the RN switches from the FDD mode to a half-duplex frequency division duplex H-FDD mode. The DeNB receives an acknowledgment message sent by the RN in FDD mode. When the DeNB verifies, according to the RN reconfiguration message and the acknowledgement message, that the RN has already started to switch from the FDD mode to the H-FDD mode, the DeNB switches from the FDD mode to the H-FDD mode.

Another aspect of the present invention provides a method for switching a working mode on a relay network. A relay node RN receives, in frequency division duplex FDD mode, an RN reconfiguration message sent by a donor eNB DeNB in frequency division duplex FDD mode. The RN starts to, according to the RN reconfiguration message, switch from the FDD mode to a half-duplex frequency division duplex H-FDD mode. The RN sends an acknowledgment message to the DeNB in FDD mode, so that the DeNB verifies, according to the RN reconfiguration message and the acknowledgement message, that the RN has already started to switch from the FDD mode to the half-duplex frequency division duplex H-FDD mode; and switching, by the DeNB, from the FDD mode to the H-FDD mode.

An embodiment of the present invention provides a base station a first sending unit is configured to send, in frequency division duplex FDD mode, an RN reconfiguration message to a relay node RN, so that the RN switches from the FDD mode to a half-duplex frequency division duplex H-FDD mode. A first receiving unit is configured to receive an acknowledgement message sent by the RN in FDD mode. A first processing unit is configured to, when it is verified, according to the RN reconfiguration message and the acknowledgement message, that the RN has already started to switch from the FDD mode to the H-FDD mode, the base station switches from the FDD mode to the H-FDD mode.

Another aspect of the present invention provides a relay node RN. A second receiving unit is configured to receive, in frequency division duplex FDD mode, an RN reconfiguration message sent by a donor eNB DeNB in frequency division duplex FDD mode. A second processing unit is configured to perform, according to the RN reconfiguration message, switching of the RN from the FDD mode to the H-FDD mode. A second sending unit is configured to send, in FDD mode, an acknowledgment message to the DeNB, so that when the DeNB verifies, according to the RN reconfiguration message and the acknowledgement message, that the RN has already started to switch from the FDD mode to the H-FDD mode, the DeNB switches from the FDD mode to the H-FDD mode.

Another aspect of the present invention provides a communications system, which includes a donor eNB DeNB and a relay node RN. The DeNB is configured to send, in frequency division duplex FDD mode, an RN reconfiguration message to a relay node RN and receive an acknowledgement message sent by the RN in FDD mode. When the DeNB verifies, according to the RN reconfiguration message and the acknowledgment message, that the RN has already started to switch from the FDD mode to an H-FDD mode, the DeNB switches from the frequency division duplex FDD mode to the half-duplex frequency division duplex H-FDD mode. The RN is configured to switch from the FDD mode to the half-duplex frequency division duplex FDD mode according to the RN reconfiguration message.

The method for switching a working mode on a relay network, the base station, the relay node, and the communications system provided by the present invention are used to ensure that a DeNB and an RN separately switch from an FDD working mode to an H-FDD working mode at a proper time, to achieve an objective that the RN accesses a relay network correctly and communicates with the DeNB correctly.

DETAILED DESCRIPTION OF ILLUSTRATIVE EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Those skilled in the art can understand that the accompanying drawings are merely schematic diagrams of one preferred embodiment and modules and processes in the accompanying drawings may not be mandatory ones for implementing the present invention.

Figure 1:
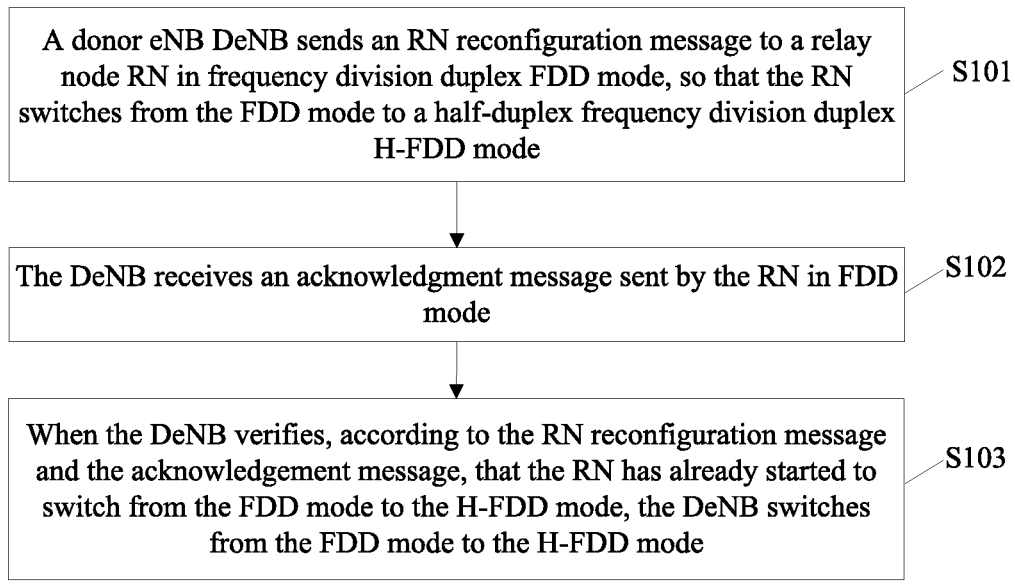
FIG. 1 is a flowchart of an embodiment of a method for switching a working mode on a relay network according to the present invention.

FIG. 1 is a flowchart of an embodiment of a method for switching a working mode on a relay network according to the present invention. The method for switching a working mode on a relay network includes the following steps.

S101. A donor eNB DeNB sends an RN reconfiguration message to a relay node RN in frequency division duplex FDD mode, so that the RN switches from the FDD mode to a half-duplex frequency division duplex H-FDD mode.

S102. The DeNB receives an acknowledgment message sent by the RN in FDD mode.

S103. When the DeNB verifies, according to the RN reconfiguration message and the acknowledgement message, that the RN has already started to switch from the FDD mode to the H-FDD mode, the DeNB switches from the FDD mode to the H-FDD mode.

In S101, when the RN accesses the DeNB, the DeNB detects the existence of the RN by using an RN access process. At this time, the DeNB and the RN are in an FDD state, and the DeNB sends a configuration message to the RN. For example, the configuration message is an RN_RECFG message used to implement radio connection management between the RN and the DeNB.

Further, the DeNB records the RN_RECFG message at a DeNB-side Packet Data Convergence Protocol (Packet Data Convergence Protocol, hereinafter abbreviated as PDCP)

layer. When the RN accesses a radio network by using the DeNB, the message sent by the DeNB to the RN undergoes a PDCP encapsulation, for example, such processing as encryption, addition of check information, and allocation of a sequence number (Sequence Number, hereinafter abbreviated as SN), and then is sent to the RN. In this embodiment, the recording the RN_RECFG at the DeNB-side DPCP protocol layer by the DeNB may be recording a first sequence number allocated by the PDCP layer to the RN_RECFG message.

Further, after the RN receives the RN_RECFG message, the RN starts to perform configuration of an RN-side radio interface protocol stack. For example, by configuring a Media Access Control layer (MAC layer) and a physical layer of the RN-side radio interface protocol stack, switching of the RN from the FDD mode to the H-FDD mode is implemented.

For example, the RN implements the configuration of the MAC layer and the physical layer of the radio interface protocol stack by configuring communication parameters in the protocol stack, where the MAC layer and the physical layer of the radio interface protocol stack are used to define subframes for the RN to send downlink data, so as to implement the switching of the RN from the FDD mode to the H-FDD mode.

In S102, if the RN correctly receives the RN_RECFG message that has undergone PDCP encapsulation, the RN sends an acknowledgement message of the RN_RECFG message to the DeNB. In this embodiment, the DeNB receives an acknowledgement message that has undergone the PDCP protocol encapsulation and is sent by the RN. If the DeNB does not receive the acknowledgement message of the RN_RECFG message, it indicates that the RN notifies the DeNB that an error occurs in the process of receiving the RN_RECFG message or that the RN_RECFG message is not received.

When the DeNB receives an acknowledgement message sent by the RN in FDD mode, the DeNB records the acknowledgement message. In this embodiment, the recording the acknowledgment message by the DeNB may be recording a second sequence number allocated by the RN-side PDCP layer to the acknowledgement message.

For example, the RN sends the acknowledgement message to the DeNB by using a radio link control layer of the RN-side radio protocol stack. In this embodiment, because the RN sends, based on the radio link control layer, the acknowledgement message to the DeNB, and time of sending the acknowledgement message is earlier than time of configuring the MAC layer and the physical layer in the RN-side radio interface protocol stack. It may be considered that the time of sending the acknowledgment message is earlier than time when the RN switches from the FDD mode to the H-FDD mode. Therefore, the RN still sends, in FDD mode, the acknowledgement message to the DeNB, which ensures that the DeNB can correctly receive the acknowledgement message sent by the RN.

In S103, the DeNB determines, according to the first sequence number of the RN_RECFG message and the second sequence number of the acknowledgment message, whether the RN has already started to switch from the FDD mode to the H-FDD mode.

In this embodiment, the DeNB determines whether the second sequence number is greater than or equal to the first sequence number.

When the DeNB determines that the second sequence number is greater than or equal to the first sequence number, the DeNB verifies that the RN has already started to switch from the FDD mode to the H-FDD mode; when the DeNB determines that the second sequence number is less than the first sequence number, the DeNB verifies that the RN does not start to switch from the FDD mode to the H-FDD mode.

On a relay network, data that does not undergo PDCP encapsulation is referred to as service data unit (hereinafter abbreviated as SDU), while data that has undergone PDCP encapsulation is referred to as protocol data unit (hereinafter abbreviated as PDU). The DeNB differentiates, according to header information of the PDU, the PDU from the SDU that does not undergo PDCP processing, and obtains the SDU and the SN from plain text information of the PDU. In this embodiment, the DeNB records a first sequence number of the RN_RECFG message that has undergone PDCP encapsulation and a second sequence number of the acknowledgement message that has undergone PDCP encapsulation.

When the DeNB determines that the second sequence number of the acknowledgement message is greater than or equal to the first sequence number of the RN_RECFG message, the DeNB verifies that the RN has already received the RN_RECFG message and the RN has already started to switch from the FDD mode to the H-FDD mode. When the DeNB verifies that the RN has already started to switch from the FDD mode to the H-FDD mode, the DeNB also starts to perform configuration of the DeNB-side radio interface protocol stack.

A size of a sequence number carried in a message that has undergone PDCP encapsulation is related to time of receiving the message that has undergone PDCP encapsulation. For a message that has undergone PDCP encapsulation and sent later, the sequence number is greater than or equal to the sequence number of a message that has undergone PDCP encapsulation and received earlier. In this embodiment, when the DeNB does not send other messages to the RN after sending the RN_RECFG message to the RN, the first sequence number of the RN_RECFG message that has undergone PDCP encapsulation is equal to the second sequence number of the acknowledgement message that has undergone PDCP encapsulation. If the DeNB also sends other messages to the RN after sending the RN_RECFG message to the RN, the first sequence number of the RN_RECFG message that has undergone PDCP encapsulation is less than the second sequence number of the acknowledgement message that has undergone PDCP encapsulation.

In this embodiment, by configuring the Media Access Control layer (Media Access Control layer, hereinafter abbreviated as MAC layer) and the physical layer of the DeNB-side radio interface protocol stack, switching of the DeNB from the FDD mode to the H-FDD mode is implemented.

For example, the DeNB implements the configuration of the MAC layer and the physical layer in the radio interface protocol stack by configuring communication parameters in the protocol stack, where the MAC layer and the physical layer of the radio interface protocol stack are used to define subframes for the DeNB to send downlink data to the RN, so as to implement the switching of the DeNB from the FDD mode to the H-FDD mode.

Further, when the DeNB switches to the H-FDD mode, the DeNB receives, in H-FDD mode, a configuration completion message sent by the RN in H-FDD mode. For example, the DeNB receives, in H-FDD mode, an RN_RECFG_CMP message sent by the RN in H-FDD mode. After the DeNB receives the configuration completion message, it may be considered that the RN has already accessed a relay network correctly.

In this embodiment, after the DeNB receives an acknowledgment message of the RN_RECFG message from the RN, it may be considered that the DeNB and the RN can separately switch to the H-FDD state. After the DeNB sends an RN_RECFG message to the RN, the RN parses the RN_RECFG message by using a radio resource control layer (Radio Resource Control layer) of the radio air interface protocol stack and further configures the MAC layer and the physical layer of the RN-side radio air interface protocol stack. Then, the RN finishes the switching from the FDD mode to the H-FDD mode. The parsing the RN_RECFG message may be as follows: After performing such processing as decryption and check information deletion on the message that is sent by the DeNB and has undergone PDCP protocol encapsulation, the RN reads the RN_RECFG message. For the DeNB, after configuring the MAC layer and the physical layer of the DeNB-side radio air interface protocol stack, the DeNB finishes the switching from the FDD mode to the H-FDD mode. Therefore, this ensures that the DeNB has already switched to the H-FDD state when receiving the RN_RECFG_CMP message from the RN, thereby ensuring that the DeNB can correctly receive the RN_RECFG_CMP message.

Figure 2:
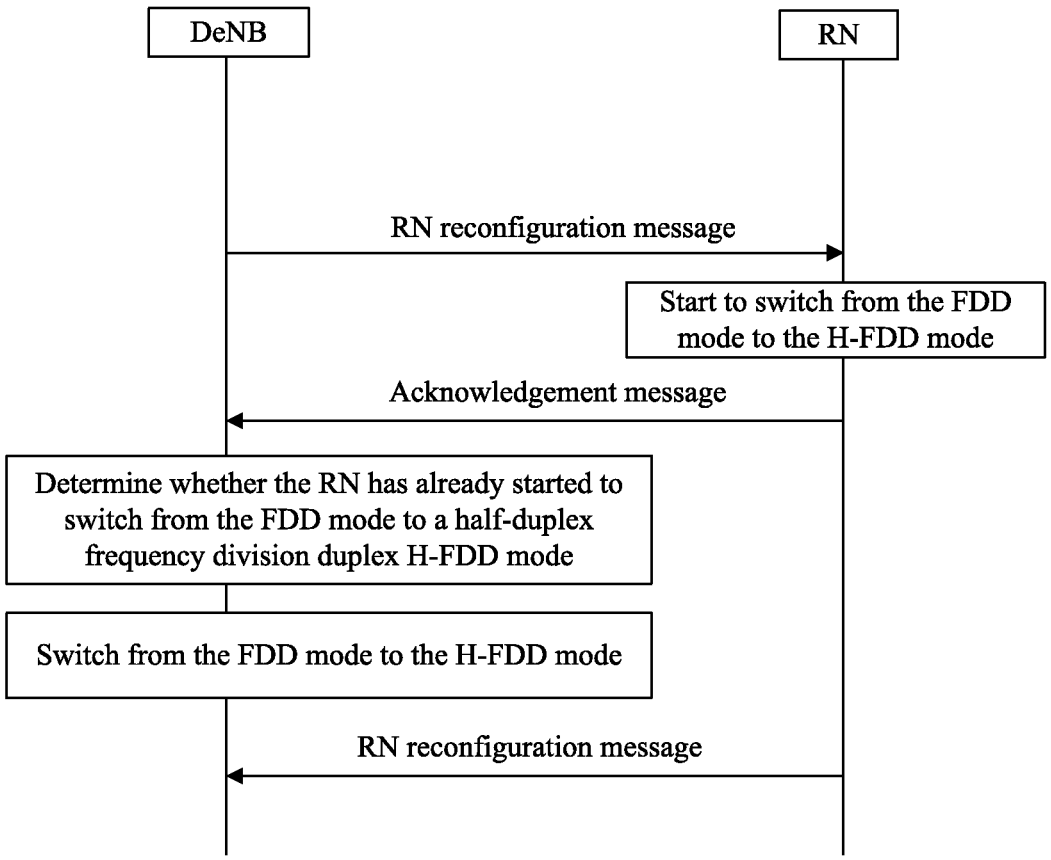
FIG. 2 is a signaling flowchart of an embodiment of a method for switching a working mode on a relay network according to the present invention.

For details about the method for switching a working mode on a relay network in this embodiment, reference may be made to a signaling flowchart illustrated in FIG. 2, which is not further described herein.

In conclusion, by using the embodiment of the present invention, a DeNB can correctly receive an acknowledgement message from an RN and meanwhile the DeNB can correctly receives an RN reconfiguration completion message from the RN, which ensures that normal switching of a state of the DeNB and a state of the RN, thereby achieving an objective that the RN accesses a relay network correctly and communicates with the DeNB correctly.

Figure 3:
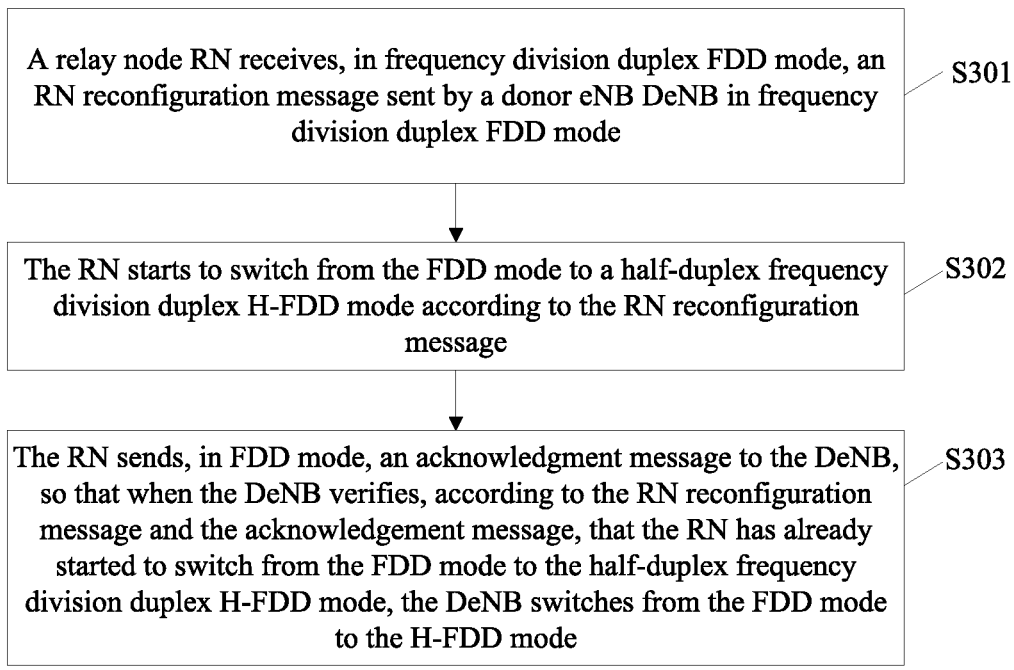
FIG. 3 is a flowchart of another embodiment of a method for switching a working mode on a relay network according to the present invention.

FIG. 3 is a flowchart of an embodiment of a method for switching a working mode on a relay network according to the present invention. As shown in FIG. 3, an embodiment of the present invention provides a method for switching a working mode on a relay network, including the following steps.

S301. A relay node RN receives, in frequency division duplex FDD mode, an RN reconfiguration message sent by a donor eNB DeNB in frequency division duplex FDD mode.

S302. The RN starts to switch from the FDD mode to a half-duplex frequency division duplex H-FDD mode according to the RN reconfiguration message.

S303. The RN sends, in FDD mode, an acknowledgment message to the DeNB, so that when the DeNB verifies, according to the RN reconfiguration message and the acknowledgement message, that the RN has already started to switch from the FDD mode to the half-duplex frequency division duplex H-FDD mode, the DeNB switches from the FDD mode to the H-FDD mode.

In this embodiment, the RN sends the acknowledgement message to the DeNB by using a radio link control layer of an RN-side radio air interface protocol stack. The RN switches, by configuring a Media Access Control layer and a physical layer in the RN-side radio air interface protocol stack, from the FDD mode to the H-FDD mode.

In this embodiment, the RN sends, in H-FDD mode, an RN reconfiguration completion message to the DeNB in H-FDD mode.

The embodiment of the present invention can ensure normal switching of a DeNB and an RN, thereby achieving an objective that the RN accesses a relay network correctly and communicates with the DeNB correctly.

Those skilled in the art can understand that all or some of the steps in the foregoing method embodiments may be implemented by related hardware instructed by a program. The program may be stored in a computer readable storage medium. When the program is executed, the steps of the foregoing method embodiments are involved. The storage medium may be various media that can store program code, such as ROM, RAM, magnetic disk, or optical disc.

Figure 4:
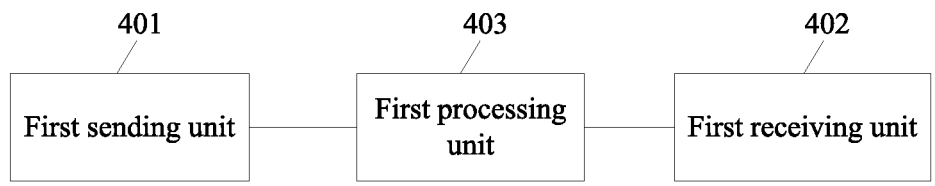
FIG. 4 is a schematic structural diagram of a base station according to an embodiment of the present invention.

As shown in FIG. 4, another embodiment of the present invention provides a base station, configured to implement the actions executed by a donor eNB during switching a mode on the relay network in the foregoing embodiments. The base station includes a first sending unit 401 is configured to send, in frequency division duplex FDD mode, an RN reconfiguration message to a relay node RN, so that the RN switches from the FDD mode to a half-duplex frequency division duplex H-FDD mode. A first receiving unit 402 is configured to receive an acknowledgement message sent by the RN in FDD mode. A first processing unit 403 is configured to: when it is verified, according to the RN reconfiguration message and the acknowledgement message, that the RN has already started to switch from the FDD mode to the H-FDD mode, the base station switches from the FDD mode to the H-FDD mode.

The first receiving unit 402 is further configured to receive, in H-FDD mode, an RN reconfiguration completion message sent by the RN in H-FDD mode.

The processing unit 403 is further configured to determine, according to a first sequence number of the RN reconfiguration message and a second sequence number of the acknowledgment message, whether the RN has already started to switch from the FDD mode to the H-FDD mode.

The processing unit 403 is further configured to: determine whether the second sequence number is greater than the first sequence number; when determining that the second sequence number is greater than or equal to the first sequence number, verify that the RN has already started to switch from the FDD mode to the H-FDD mode; when determining that the second sequence number is less than the first sequence number, verify that the RN does not start to switch from the FDD mode to the H-FDD mode.

The processing unit 403 is further configured to perform, by configuring a Media Access Control layer and a physical layer of a base station-side radio air interface protocol stack, switching of the eNB from the FDD mode to the H-FDD mode.

Those skilled in the art can understand that for details about specific functions and effects implemented by each unit of the base station, reference may be made to the embodiment illustrated in FIG. 1, which is not further described herein.

The embodiment of the present invention can ensure normal switching of a DeNB and an RN, thereby achieving an objective that the RN accesses a relay network correctly and communicates with the DeNB correctly.

Figure 5:
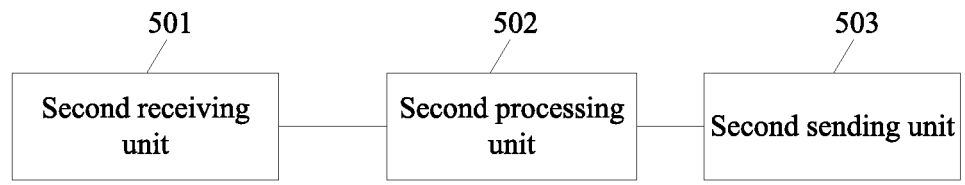
FIG. 5 is a schematic structural diagram of a relay node according to an embodiment of the present invention.

As shown in FIG. 5, another embodiment of the present invention provides a relay node, configured to implement the actions executed by the relay node during switching a mode on the relay network in the foregoing embodiments. The relay node includes: a second receiving unit 501, configured to receive, in frequency division duplex FDD mode, an RN reconfiguration message sent by a donor eNB DeNB in frequency division duplex FDD mode; a second processing unit 502, configured to switch from the FDD mode to an H-FDD mode according to the RN reconfiguration message; and a second sending unit 503, configured to send, in FDD mode, an acknowledgment message to the DeNB, so that when the DeNB verifies, according to the RN reconfiguration message and the acknowledgement message, that the RN has already started to switch from the FDD mode to the H-FDD mode, the DeNB switches from the FDD mode to the H-FDD mode.

The second sending unit 503 is further configured to send, in H-FDD mode, an RN reconfiguration completion message to the DeNB in H-FDD mode.

The second processing unit 502 is further configured to switch, by configuring a Media Access Control layer and a physical layer of an RN-side radio air interface protocol stack, from the FDD mode to the H-FDD mode.

Those skilled in the art can understand that for details about specific functions and effects implemented by each unit of the relay node, reference may be made to the embodiment illustrated in FIG. 2, which is not further described herein.

The embodiment of the present invention can ensure normal switching of a DeNB and an RN, thereby achieving an objective that the RN accesses a relay network correctly and communicates with the DeNB correctly.

Figure 6:
FIG. 6 is a schematic structural diagram of a communications system according to an embodiment of the present invention.

As shown in FIG. 6, another embodiment of the present invention provides a communications system, including a DeNB 601 and a RN 602. The DeNB 601 is configured to send, in frequency division duplex FDD mode, an RN reconfiguration message to the RN 602 receive an acknowledgement message sent by the RN 602 in FDD mode. When the DeNB 601 verifies, according to the RN reconfiguration message and the acknowledgment message, that the RN 602 has already started to switch from the FDD mode to the H-FDD mode, the DeNB 601 switches from the frequency division duplex FDD mode to a half-duplex frequency division duplex H-FDD mode. The RN 602 is configured to switch from the FDD mode to the half-duplex frequency division duplex FDD mode according to the RN reconfiguration message.

For details about the DeNB 601, reference may be made to the DeNB illustrated in FIG. 4. For details about the RN 602, reference may be made to the RN illustrated in FIG. 5. The communications system provided in this embodiment is configured to implement the method for switching a working mode on a relay network of the present invention and ensure a normal switching of an RN and a DeNB, thereby achieving an objective that the RN accesses a relay network correctly and communicates with the DeNB correctly.

Those skilled in the art can understand that modules in the unit provided in the embodiment can be distributed in the unit of the embodiment according to the description of the embodiment or be placed in one or multiple units different from this embodiment by using corresponding modifications. The modules of the foregoing embodiment may be combined into one module or be further split into multiple submodules.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method for switching a working mode on a relay network, the method comprising:
    sending, by a donor eNB (DeNB) a relay node (RN) reconfiguration message to a RN in frequency division duplex (FDD) mode, so that the RN switches from the FDD mode to a half-duplex frequency division duplex (H-FDD) mode;
    receiving, by the DeNB, an acknowledgment message sent by the RN in FDD mode;
    after receiving the acknowledgment message, verifying, by the DeNB that the RN has already started to switch from the FDD mode to the H-FDD mode according to the RN reconfiguration message and the acknowledgement message;
    switching, by the DeNB, from the FDD mode to the H-FDD mode; and
    receiving, by the DeNB in H-FDD mode, an RN reconfiguration completion message sent by the RN in H-FDD mode.

2. The method for switching a working mode on a relay network according to claim 1, further comprising determining, by the DeNB, whether the RN has already started to switch from the FDD mode to the H-FDD mode according to a first sequence number of the RN reconfiguration message and a second sequence number of the acknowledgment message.

3. The method according to claim 2, wherein determining whether the RN has already started to switch from the FDD mode to the H-FDD mode comprises determining that the RN has already started to switch from the FDD mode to the H-FDD mode when the second sequence number is greater than or equal to the first sequence number; and determining that RN has not started to switch from the FDD mode to the H-FDD mode when the second sequence number is less than the first sequence number.

4. The method according to claim 2, further comprising:
    recording, by the DeNB, the first sequence number in the RN configuration message, the first sequence number being added into the RN reconfiguration message by a DeNB-side Packet Data Convergence Protocol layer; and
    recording, by the DeNB, the second sequence number in the acknowledgement message, the second sequence number being added into the acknowledgement message by an RN-side Packet Data Convergence Protocol layer.

5. The method according to claim 1, further comprising switching from the FDD mode to the H-FDD mode by configuring a Media Access Control layer and a physical layer of an air interface protocol stack in a DeNB side.

6. A method for switching a working mode on a relay network, the method comprising:
    receiving, by a relay node (RN) in a frequency division duplex (FDD) mode, an RN reconfiguration message sent by a donor eNB (DeNB) in the FDD mode;
    starting to switch the RN from the FDD mode to a half-duplex frequency division duplex (H-FDD) mode according to the RN reconfiguration message;
    sending, by the RN in the FDD mode, an acknowledgment message to the DeNB, wherein upon receiving the acknowledgment message the DeNB verifies, according to the RN reconfiguration message and the acknowledgement message, that the RN has already started to switch from the FDD mode to the H-FDD mode, and wherein the DeNB switches from the FDD mode to the H-FDD mode after verifying that the RN has already started to switch from the FDD mode to the H-FDD mode; and
    sending, by the RN in H-FDD mode, an RN reconfiguration completion message to the DeNB in H-FDD mode.

7. The method according to claim 6, further comprising switching, by the RN, from the FDD mode to the H-FDD mode by configuring a Media Access Control layer and a physical layer in an air interface protocol stack of an RN side.

8. A base station, comprising:
 a sending unit configured to send, in a frequency division duplex (FDD) mode, a relay node (RN) reconfiguration message to an RN;
 a receiving unit configured to receive an acknowledgement message sent by the RN in the FDD mode, the acknowledgment message verifying that the RN is switching from the FDD mode to a half-duplex frequency division duplex (H-FDD) mode; and
 a, configured to switch from the FDD mode to the H-FDD mode after verifying that the RN has already started to switch from the FDD mode to the H-FDD mode,
 wherein the receiving unit is further configured to receive, in the H-FDD mode, an RN reconfiguration completion message sent by the RN in H-FDD mode.

9. The base station according to claim 8, wherein the processing unit is further configured to determine, according to a first sequence number of the RN reconfiguration message and a second sequence number of the acknowledgment message, whether the RN has already started to switch from the FDD mode to the H-FDD mode.

10. The base station according to claim 9, wherein the processing unit is further configured to determine that the RN has already started to switch from the FDD mode to the H-FDD mode when the second sequence number is greater than or equal to the first sequence number, and to determine that the RN has not started to switch from the FDD mode to the H-FDD mode when the second sequence number is less than the first sequence number.

11. The base station according to claim 8, wherein the processing unit is further configured to perform, by configuring a Media Access Control layer and a physical layer in an air interface protocol stack of a base station side, switching of the base station from the FDD mode to the H-FDD mode.

12. A relay node, comprising:
 a receiving unit, configured to receive, in a frequency division duplex (FDD) mode, a relay node (RN) reconfiguration message sent by a donor eNB (DeNB) in the FDD mode;
 a processing unit, configured to perform, according to the RN reconfiguration message, switching of the RN from the FDD mode to a half-duplex frequency division duplex (H-FDD) mode; and
 a sending unit, configured to send, in the FDD mode, an acknowledgment message to the DeNB, wherein upon receiving the acknowledgment message the DeNB verifies, according to the RN reconfiguration message and the acknowledgement message, that the RN has already started to switch from the FDD mode to the H-FDD mode, and wherein the DeNB switches from the FDD mode to the H-FDD mode after verifying that the RN has already started to switch from the FDD mode to the H-FDD mode; and
 wherein the sending unit is further configured to send, in the H-FDD mode, an RN reconfiguration completion message to the DeNB in H-FDD mode.

13. The relay node according to claim 12, wherein the processing unit is configured to switch from the FDD mode to the H-FDD mode by configuring a Media Access Control layer and a physical layer in an air interface protocol stack of an RN side.

14. A communications system, comprising:
 a donor eNB (DeNB); and
 a relay node (RN);
 wherein the DeNB is configured to send, in a frequency division duplex (FDD) mode, an RN reconfiguration message to the RN and to receive an acknowledgement message sent by the RN in the FDD mode,
 wherein the DeNB verifies, according to a first sequence number of the RN reconfiguration message and a second sequence number of the acknowledgment message, that the RN has already started to switch from the FDD mode to a half-duplex frequency division duplex (H-FDD) mode, and to switch from the FDD mode to the H-FDD mode after verifying that the RN has already started to switch from the FDD mode to the H-FDD mode; and
 wherein the RN is configured to switch from the FDD mode to the half-duplex frequency division duplex FDD mode according to the RN reconfiguration message.

15. The communications system according to claim 14, wherein the DeNB is further configured to determine that the RN has already started to switch from the FDD mode to the H-FDD mode when the second sequence number is greater than or equal to the first sequence number, and to determine that the RN has not started to switch from the FDD mode to the H-FDD mode when the second sequence number is less than the first sequence number.

16. The communications system according to claim 14, wherein the DeNB is configured to record the first sequence number of the RN reconfiguration message, and to record the second sequence number of the acknowledgement message.

17. The communications system according to claim 16, wherein the first sequence number is added to the RN reconfiguration message via a DeNB-side Packet Data Convergence Protocol layer.

18. The communications system according to claim 16, wherein the second sequence number is added to the acknowledgment message via an RN-side Packet Data Convergence Protocol layer.

19. The communications system according to claim 14, wherein the RN is configured to send, in the H-FDD mode, an RN reconfiguration completion message to the DeNB in the H-FDD mode.

20. The communications system according to claim 14, wherein the DeNB is further configured to receive, in the H-FDD mode, an RN reconfiguration completion message from the RN in the H-FDD mode.

* * * * *